US008204351B2

(12) United States Patent
Omori et al.

(10) Patent No.: US 8,204,351 B2
(45) Date of Patent: Jun. 19, 2012

(54) OPTICAL MODULE

(75) Inventors: Koichi Omori, Yokohama (JP); Hiroyoshi Ishii, Yokohama (JP); Toshikazu Otake, Yokohama (JP)

(73) Assignee: Opnext Japan, Inc., Kanagawa (JP)

( * ) Notice: Subject to any disclaimer, the term of this patent is extended or adjusted under 35 U.S.C. 154(b) by 114 days.

(21) Appl. No.: 12/760,579

(22) Filed: Apr. 15, 2010

(65) Prior Publication Data

US 2011/0026893 A1 Feb. 3, 2011

(30) Foreign Application Priority Data

Jul. 29, 2009 (JP) ................................ 2009-176664

(51) Int. Cl.
*G02B 6/00* (2006.01)
(52) U.S. Cl. ........................................................ 385/135
(58) Field of Classification Search ................... 385/135
See application file for complete search history.

(56) References Cited

U.S. PATENT DOCUMENTS

| | | | | |
|---|---|---|---|---|
| 5,442,725 A * | 8/1995 | Peng | ............................. | 385/135 |
| 6,360,049 B1 * | 3/2002 | Freed et al. | ................... | 385/134 |
| 6,741,784 B1 * | 5/2004 | Guan | ............................. | 385/135 |
| 2003/0210883 A1 * | 11/2003 | Barthel et al. | ................. | 385/135 |
| 2005/0135770 A1 * | 6/2005 | McClellan et al. | ............ | 385/135 |
| 2006/0210229 A1 * | 9/2006 | Scadden | ....................... | 385/135 |

FOREIGN PATENT DOCUMENTS

| JP | 2003-107249 | 4/2003 |
|---|---|---|
| JP | 2003-322726 | 11/2003 |

* cited by examiner

*Primary Examiner* — Charlie Peng
*Assistant Examiner* — Mary El Shammaa
(74) *Attorney, Agent, or Firm* — Antonelli, Terry, Stout & Kraus, LLP.

(57) ABSTRACT

Provided is an optical module including: an optical assembly incorporating a light emitting or receiving device for converting one of an electrical signal and an optical signal into another of the electrical signal and the optical signal; a circuit board electrically connected to the optical assembly; an optical fiber optically connected to the optical assembly; a tray for winding the optical fiber therein and pulling out the optical fiber therefrom; and a case receiving the optical assembly, the circuit board, the optical fiber, and the tray. In the optical module, the tray is fixed with respect to the case so as to be reciprocatingly movable only within a restricted range, and the tray is moved from a position to another position within the restricted range so as to be moved away from an electrical connection section between the optical assembly and the circuit board.

8 Claims, 6 Drawing Sheets

OPTICAL MODULE

CROSS-REFERENCE TO RELATED APPLICATION

The present application claims priority from Japanese application JP2009-176664 filed on Jul. 29, 2009, the content of which is hereby incorporated by reference into this application.

BACKGROUND OF THE INVENTION

1. Field of the Invention

The present invention relates to an optical module.

2. Description of the Related Art

There has been known an optical module including: an optical assembly incorporating a light emitting device or a light receiving device for converting an electrical signal into an optical signal and vice versa; an optical fiber optically connected to the optical assembly; a circuit board to which the optical assembly is electrically connected; and a terminal formed in the circuit board. Further, there has been known that the optical fiber is wound in a tray, to thereby accommodate extra length (see Japanese Patent Application Laid-open No. 2003-107249 and Japanese Patent Application Laid-open No. 2003-322726).

Conventionally, the tray in which the optical fiber is wound is fixed to a case for the optical module with screws. In this case, the optical fiber may be damaged if a force of bending, pulling, twisting, or the like is applied to the optical fiber upon detaching the tray for repairing the optical assembly or the like.

SUMMARY OF THE INVENTION

Therefore, it is an object of the present invention to prevent an optical fiber from being damaged.

(1) According to the present invention, there is provided an optical module including: an optical assembly incorporating a light emitting device or a light receiving device for converting one of an electrical signal and an optical signal into another of the electrical signal and the optical signal; a circuit board electrically connected to the optical assembly; an optical fiber optically connected to the optical assembly; a tray for winding the optical fiber therein and pulling out the optical fiber therefrom; and a case receiving the optical assembly, the circuit board, the optical fiber, and the tray. In the optical module, the tray is fixed with respect to the case so as to be reciprocatingly movable only within a restricted range, and the tray is moved from a position to another position within the restricted range so as to be moved away from an electrical connection section between the optical assembly and the circuit board. According to the present invention, it is possible to move the tray away from the electrical connection section between the optical assembly and the circuit board. In addition, movement of the tray is restricted, and hence excessive load is not applied to the optical fiber. Thus, it is possible to prevent the optical fiber from, being damaged.

(2) In the optical module according to the item (1), the tray may be fixed to the case so as to be rotatable.

(3) In the optical module according to the item (2), the optical fiber may be pulled out from a center axis of rotation of the tray.

(4) In the optical module according to the item (1), the tray may be slidably fixed with respect to the case.

(5) In the optical module according to any one of the items (1) to (4), the tray may include a winding portion around which the optical fiber is arranged while being wound at a plurality of times.

(6) In the optical module according to the item (5), the optical assembly may include a plurality of optical assemblies, the optical module may include the plurality of optical assemblies, the plurality of optical assemblies may include: a first optical assembly incorporating the light emitting device; and a second optical assembly incorporating the light receiving device, the optical fiber may include a plurality of optical fibers, the optical module may further include the plurality of optical fibers, the plurality of optical fibers may include: a first optical fiber optically connected to the first optical assembly; and a second optical fiber optically connected to the second optical assembly, the winding portion may include a plurality of winding portions, the tray may include the plurality of winding portions, and the plurality of winding portions may include: a first winding portion in which the first optical fiber is arranged while being wound around the first winding portion; and a second winding portion in which the second optical fiber is arranged while being wound around the second winding portion.

(7) In the optical module according to the item (5) or (6), the optical fiber may include a splice portion at which a cut portion of the optical fiber is spliced, the winding portion may include a guide portion for restricting bending of the optical fiber, and the splice portion may be guided with the guide portion.

(8) In the optical module according to any one of the items (1) to (7), movement restriction to at least one direction within the restricted range may be performed through bringing the tray into contact with the case or the circuit board.

(9) The optical module according to any one of the items (1) to (7) may further include a stopper for restricting the tray from being moved to at least one direction within the restricted range.

DETAILED DESCRIPTION OF THE INVENTION

Hereinafter, embodiments of the present invention are described with reference with the drawings.

First Embodiment

Figure 1:
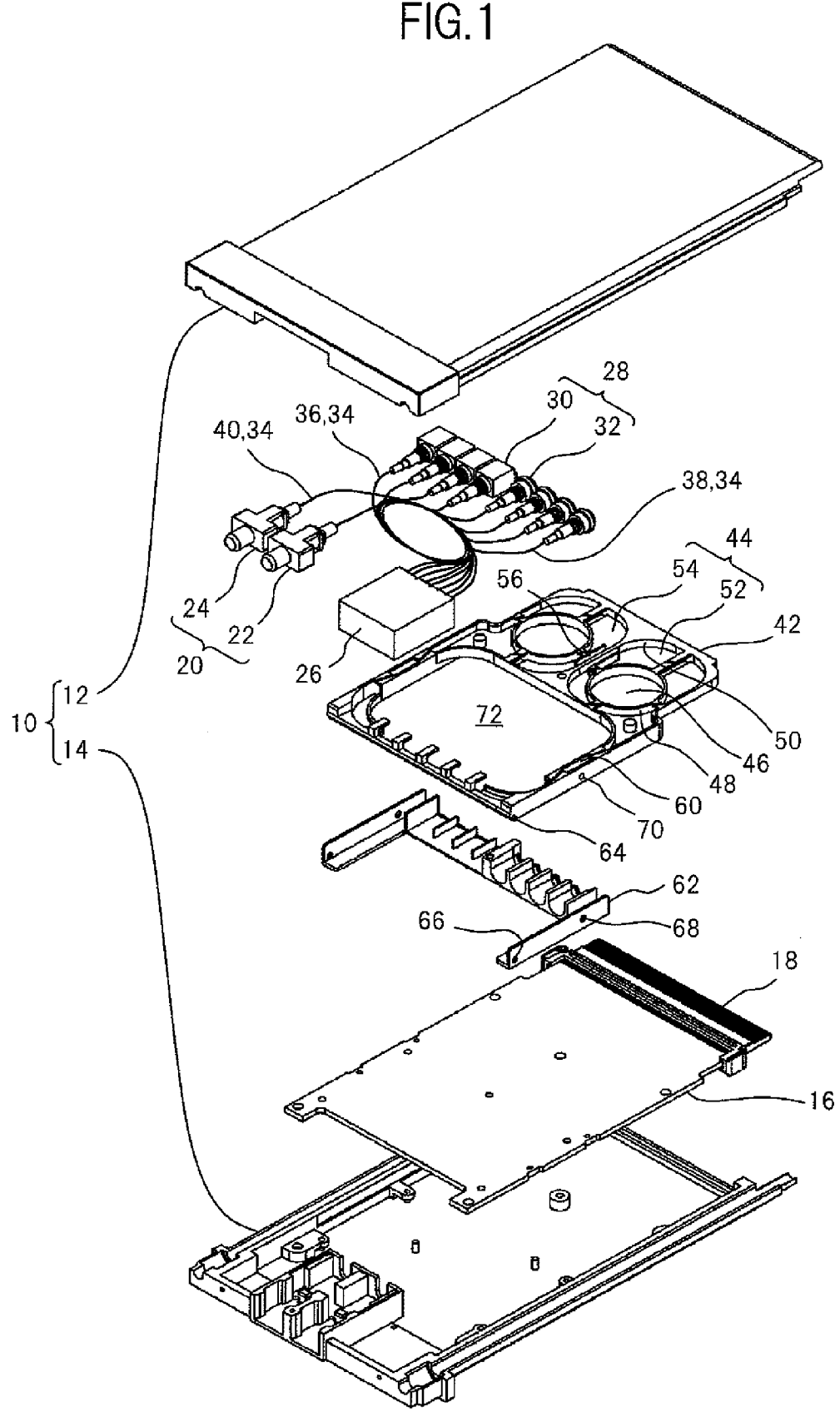
FIG. 1 is an exploded perspective view of an optical module according to a first embodiment to which the present invention is applied.
Figure 2:
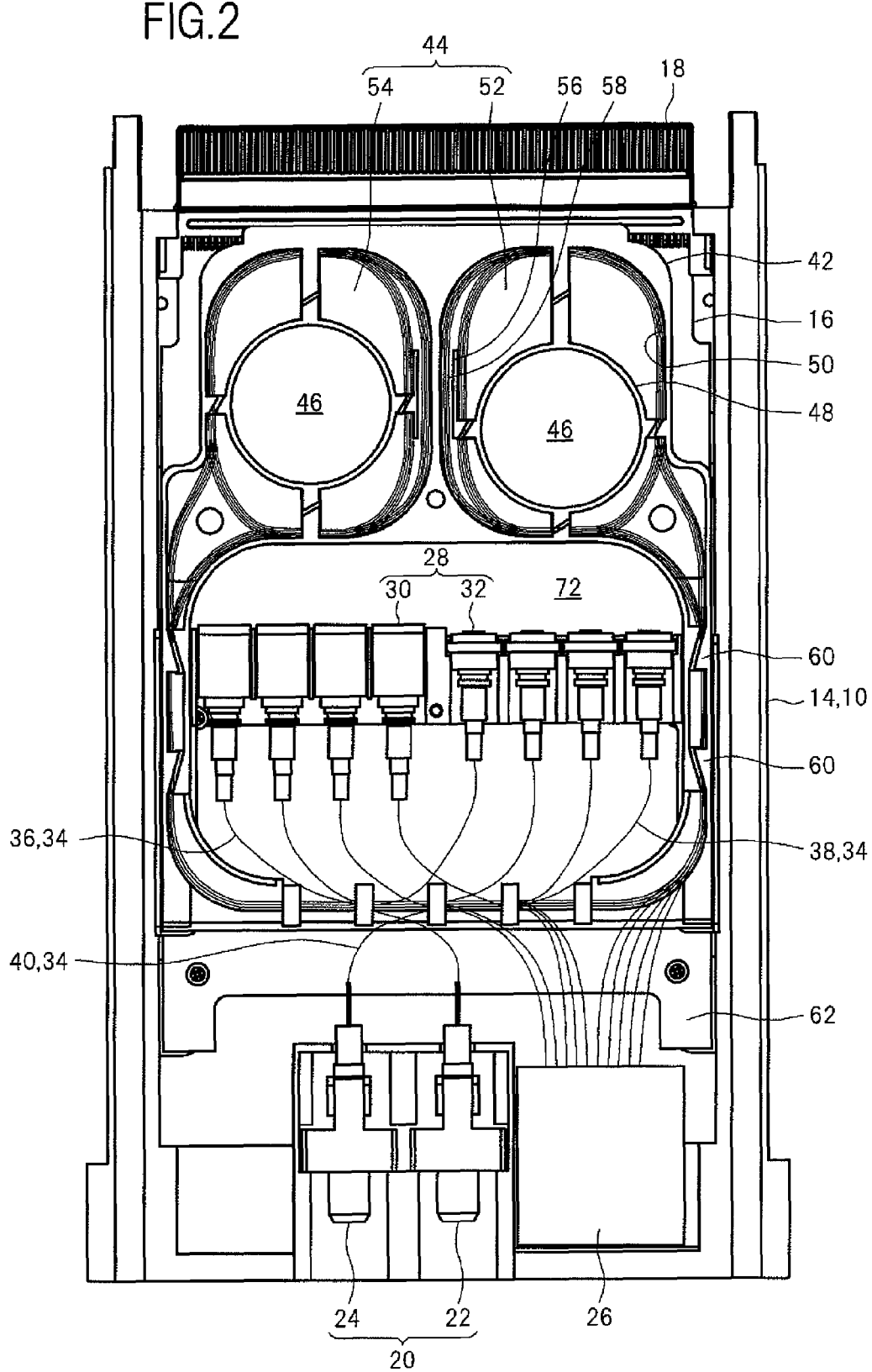
FIG. 2 is a plan view illustrating an inner structure of the optical module.

FIG. 1 is an exploded perspective view of an optical module according to a first embodiment to which the present invention is applied. FIG. 2 is a plan view illustrating an inner structure of the optical module.

The optical module includes a case 10. The case 10 is separated into an upper case 12 and a lower case 14, and the upper case 12 and the lower case 14 are fixed to each other with screws (not shown). The case 10 receives various components as follows.

The case 10 receives a circuit board 16. Specifically, the circuit board 16 is fixed to the lower case 14. The circuit board 16 includes a wiring pattern (not shown) formed thereon and electronic components (not shown) mounted thereon, and is provided with a terminal 18 for electrical connection to the outside of the circuit board 16.

The case 10 further receives a pair of connectors 20 for optical connection to the outside thereof. The connectors 20 are classified into an input connector 22 and an output connector 24. The connectors 20 are fitted into a receiving portion formed inside the lower case 14.

The case 10 further receives a multiplexer/demultiplexer 26. The multiplexer/demultiplexer 26 includes a multiplexer for multiplexing a plurality of optical signals into a single optical signal and outputting the multiplexed single optical signal, and a demultiplexer for demultiplexing a single optical signal into a plurality of optical signals and outputting the plurality of demultiplexed optical signals.

The case 10 further receive a plurality of optical assemblies 28. The optical assemblies 28 are classified into first optical assemblies 30 each incorporating a light emitting device for converting an electrical signal into an optical signal, and second optical assemblies 32 each incorporating a light receiving device for converting an optical signal into an electrical signal. The optical assemblies 28 are electrically connected to the circuit board 16. For electrical connection, soldering (not shown) is employed. Further, the optical assemblies 28 and the circuit board 16 may be physically fixed to each other.

The case 10 further receives a plurality of optical fibers 34. The optical fibers 34 are optically connected to the optical assemblies 28 or the connectors 20. The optical fibers 34 are classified into first optical fibers 36 including one end portions optically connected to the first optical assemblies 30, second optical fibers 38 including one end portions optically connected to the second optical assemblies 32, and third optical fibers 40 including one end portion optically connected to the connectors 20.

The other end portions of the optical fibers 34 are optically connected to the multiplexer/demultiplexer 26. Optical signals are input from the plurality of first optical assemblies 30 through the plurality of first optical fibers 36 into the multiplexer/demultiplexer 26, and then are multiplexed by the multiplexer/demultiplexer 26 into a single optical signal. After that, the multiplexed single optical signal is output through one of the third optical fibers 40 from the output connector 24. An optical signal is input from the input connector 22 through the other of the third optical fibers 40 into the multiplexer/demultiplexer 26, and then is demultiplexed by the multiplexer/demultiplexer 26 into a plurality of signals. After that, the plurality of demultiplexed signals are input through the plurality of second optical fibers 38 into the plurality of second optical assemblies 32.

The case 10 further receives a tray 42. The tray 42 may be formed of a material having a high thermal conductivity such as aluminum, to thereby enhance heat dissipation effect. The optical fibers 34 are wound in the tray 42 and pulled out from the tray 42. The tray 42 includes winding portions 44. In each of the winding portions 44, the optical fibers 34 are arranged while being wound around the winding portion 44 at a plurality of times. Each of the winding portions 44 includes therein an opening 46.

Each of the winding portions 44 has a ring-shaped recessed portion, and includes an inner peripheral surface 48 and an outer peripheral surface 50 opposed to each other. The optical fibers 34 are arranged while being wound between the inner peripheral surface 48 and the outer peripheral surface 50. Both of the inner peripheral surface 48 and the outer peripheral surface 50 are formed at such a curvature that the optical fibers 34 are not damaged by the inner peripheral surface 48 and the outer peripheral surface 50. In this manner, the inner peripheral surface 48 and the outer peripheral surface 50 restricts general bending of the optical fibers 34 each wound around the winding portions 44. The winding portions 44 are classified into a first winding portion 52 in which the first optical fibers 36 are arranged while being wound around the first winding portion 52, and a second winding portion 54 in which the second optical fibers 38 are arranged while being wound around the second winding portion 54.

Each of the winding portions 44 includes a guide portion 56 for restricting partial bending of the optical fibers 34. The optical fibers 34 include splice portions 58 as portions in which cut points of the optical fibers 34 are spliced together. Each of the splice portions 58 is guided with the guide portion 56. The splice portions 58 may be attached to the tray 42 through a pressure sensitive adhesive sheets (not shown), or may be held by being pressed through elastic bodies (not shown) such as rubbers. In this manner, it is possible to suppress stress from generating in the splice portions 58.

In the tray 42, there are formed catches 60 for retaining the optical fibers 34 in paths through which the optical fibers 34 are guided to the winding portions 44. On each of sides in a width direction of the tray, a pair of catches 60 are opposed to each other while forming a gap therebetween. The optical fibers 34 are forced into the gap. The catches 60 may be formed of resins so as to be crushed, to thereby prevent the optical fibers 34 from being detached.

The case 10 further receives an attachment 62. The attachment 62 is fixed to the circuit board 16. The attachment 62 retains the optical assemblies 28, and the tray 42 is mounted on the attachment 62. The tray 42 is fixed through the attachment 62 in the case 10.

The tray 42 is rotatable. For example, the tray 42 includes a pair of first protrusions 64 protruding to directions opposed to each other along the same straight line, and the attachment 62 includes first holes 66 aligned with the center axis of rotation of the tray 42. The first protrusions 64 are inserted into the first holes 66, respectively, and are supported by the attachment 62 so that the tray 42 is rotatable.

Figure 3:
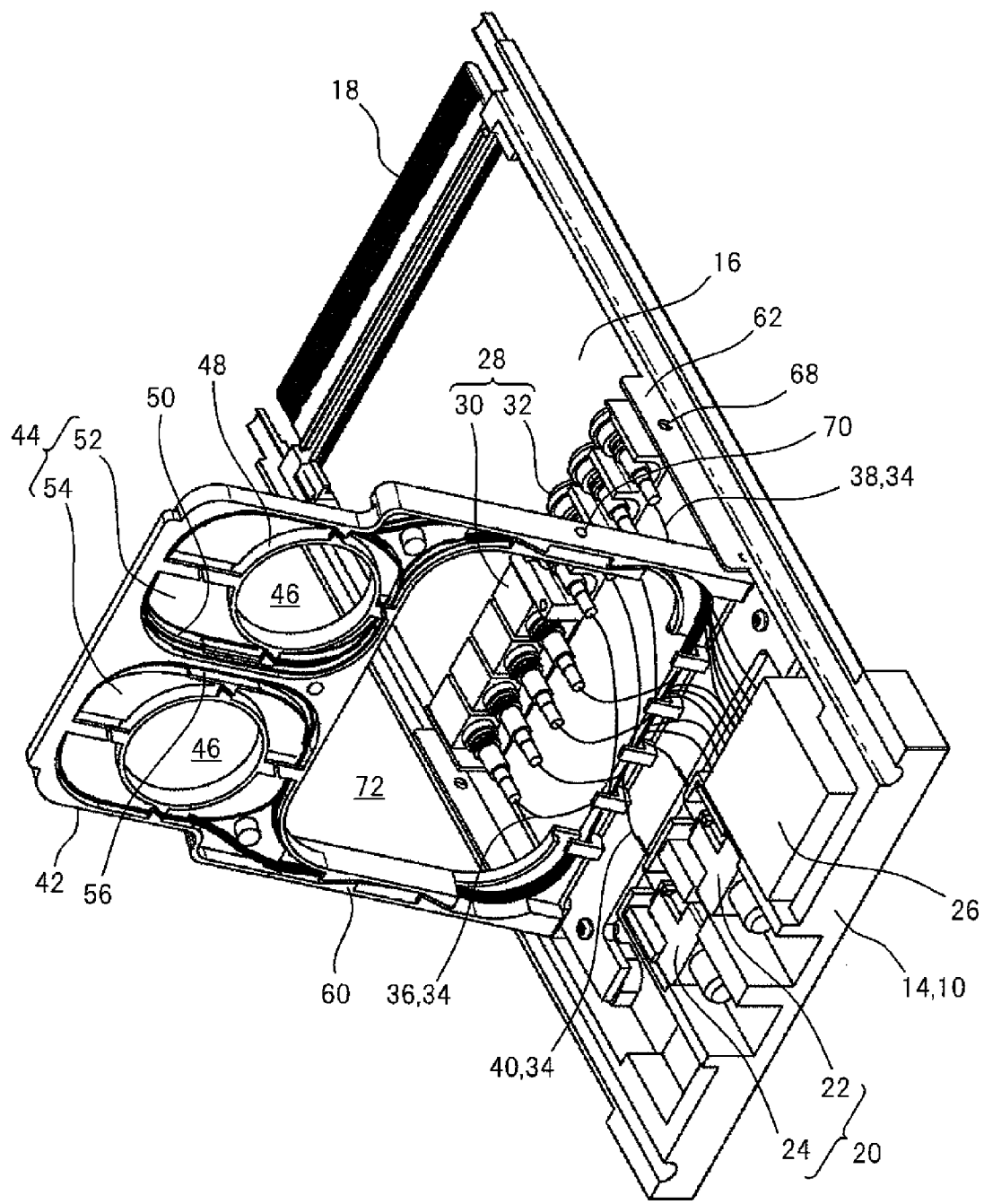
FIG. 3 is a view illustrating a state in which a tray is opened.
Figure 4:
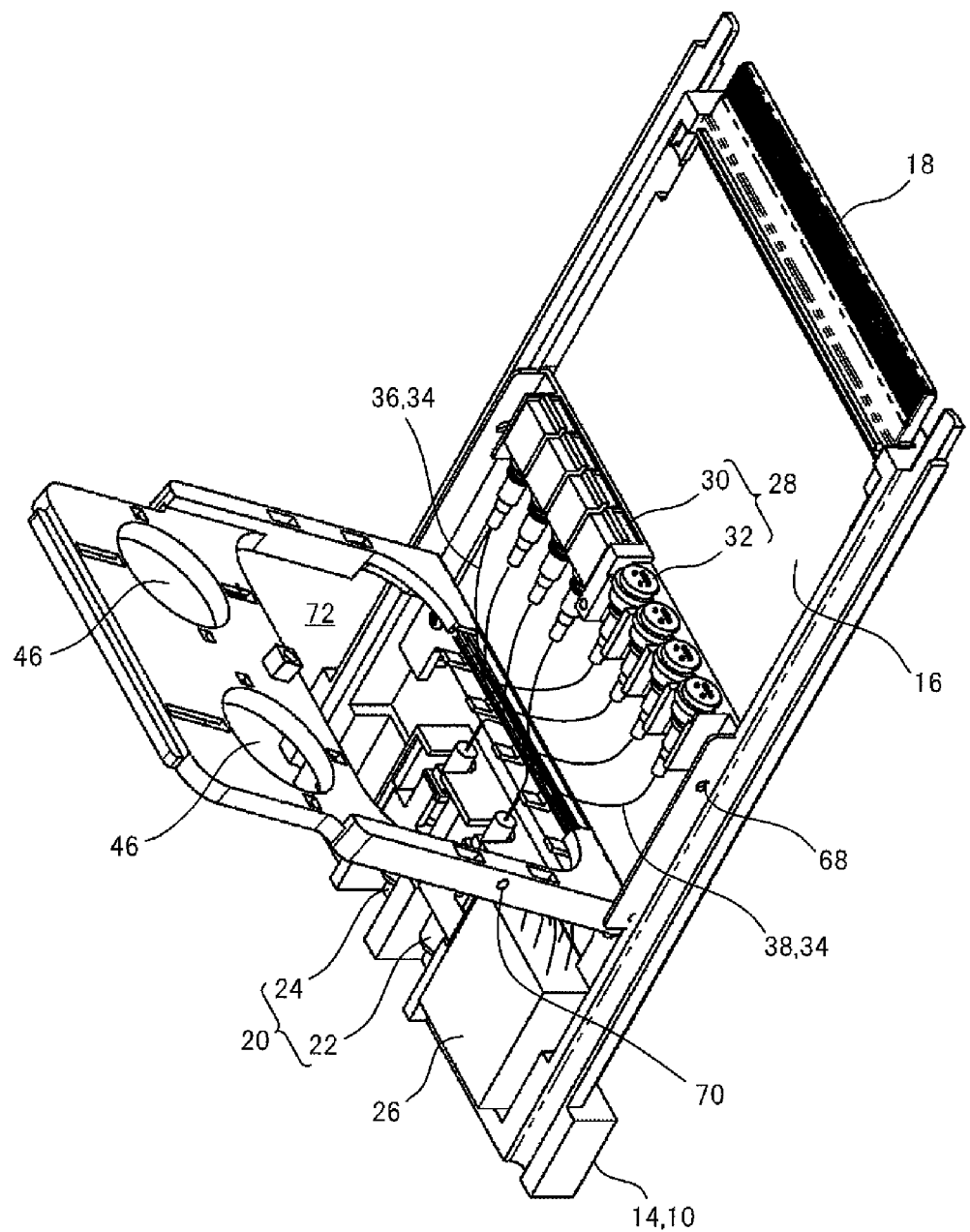
FIG. 4 is another view illustrating the state in which the tray is opened.

FIG. 3 and FIG. 4 are views each illustrating a state in which the tray 42 is opened. The tray 42 can be put in the opened state illustrated in FIG. 3 and FIG. 4 by being rotated from the closed state illustrated in FIG. 2.

The tray 42 is fixed with respect to the case 10 so as to be reciprocatingly movable only within a restricted range. Movement restriction to one direction (for example, opening direction) within the restricted range is performed through bringing the tray 42 into contact with the case 10 or the circuit board 16.

Movement restriction of the tray 42 to the other direction (for example, closing direction) within the restricted range is performed by stoppers. For example, the attachment 62 includes second holes 68, and the tray 42 includes second protrusions 70. The second protrusions 70 as stoppers are fitted into the second holes 68, respectively. In this way, movement of the tray 42 is restricted.

The tray 42 is moved from a position (state illustrated in FIG. 2) to another position (see FIG. 3 or FIG. 4) within the restricted range so as to be moved away from an electrical connection section (not shown) between the optical assemblies 28 and the circuit board 16. Therefore, even after incorporation of the tray 42, it is possible to perform electrical connection between the optical assemblies 28 and the circuit board 16. Therefore, it is possible to readily repair the optical assemblies 28. Note that, the tray 42 is provided with an opening portion 72, and the optical assemblies 28 and other electronic components (not shown) can be arranged in the opening portion 72.

The optical fibers 34 are pulled out from the center axis or the vicinity of the center axis of rotation of the tray 42 (for example, within a radius of 10 mm from the center axis (preferably, within 5 mm)). Therefore, even when the tray 42 is rotated, it is possible to reduce the corresponding displacement of the optical fibers 34 to a negligible degree (see FIG. 3 or FIG. 4).

According to the first embodiment, it is possible to move the tray 42 so as to be away from the electrical connection section (not shown) between the optical assemblies 28 and the circuit board 16. In addition, movement of the tray 42 is restricted, and hence excessive load is not applied to the optical fibers 34. Thus, it is possible to prevent the optical fibers 34 from being damaged.

Second Embodiment

Figure 5:
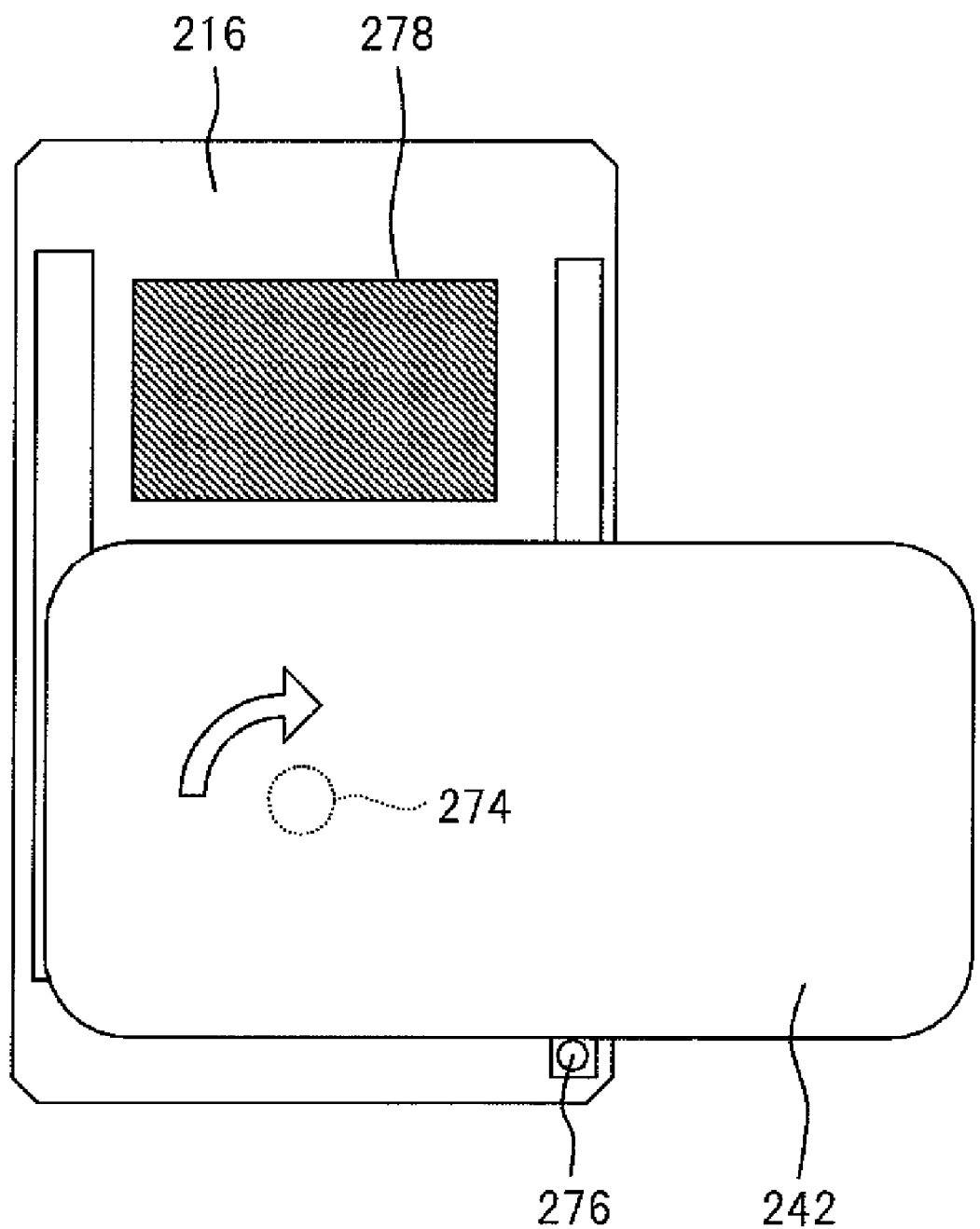
FIG. 5 is a plan view of an optical module according to a second embodiment to which the present invention is applied.

FIG. 5 is a plan view of an optical module according to a second embodiment to which the present invention is applied.

In the second embodiment, through a shaft 274, a tray 242 is rotatably fixed to a circuit board 216. The circuit board 216 is provided with a pin 276 disposed within a range of a track described by the rotating tray 242. The pin 276 serves as a stopper to restrict movement to one direction within a restricted range of the tray 242. Note that the restriction of movement to the other direction can be similarly performed.

Also in the second embodiment, the tray 242 is fixed with respect to a case (not shown) so as to be reciprocatingly movable only within the restricted range. The tray 242 is moved from a position to another position within the restricted range so as to be moved away from an electrical connection section 278 between optical assemblies (not shown) and the circuit board 216. Other structures, actions, and effects of the second embodiment are the same as those of the above-mentioned first embodiment.

Third Embodiment

Figure 6A:
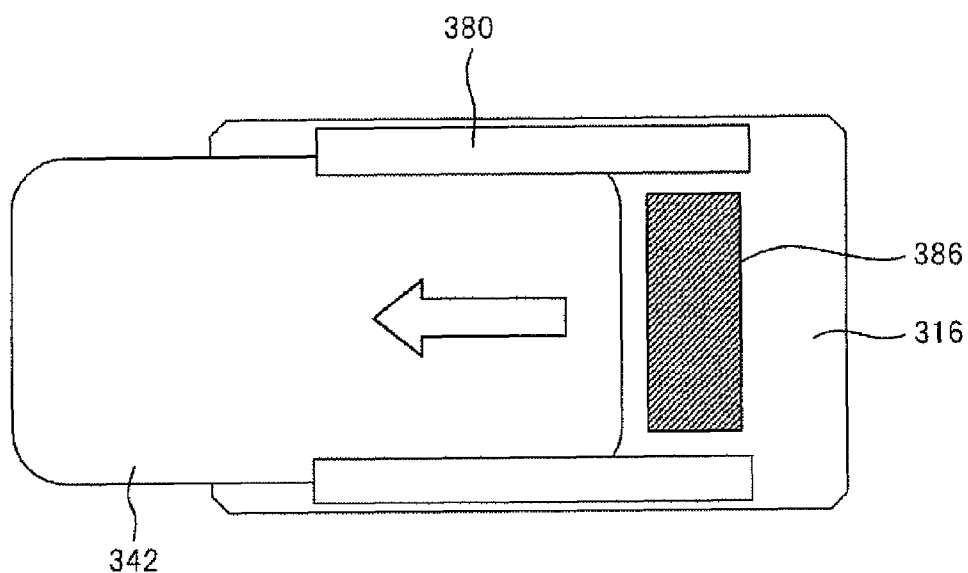
FIGS. 6A and 6B are a plan view and a side view, respectively, of an optical module according to a third embodiment to which the present invention is applied.
Figure 6B:
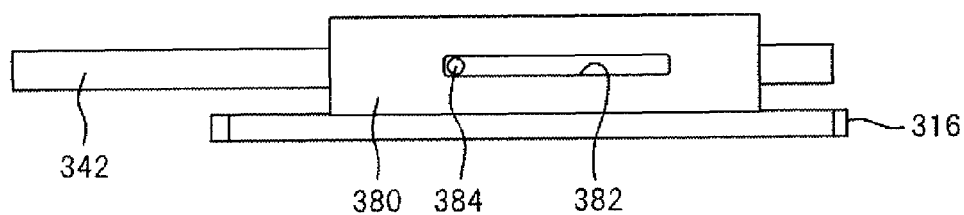

FIG. 6A and FIG. 6B are a plan view and a side view, respectively, of an optical module according to a third embodiment to which the present invention is applied.

In the third embodiment, guide rails 380 are fixed to a circuit board 316. A tray 342 is reciprocatingly movable while being guided with the guide rails 380. In other words, the tray 342 is slidably fixed with respect to a case (not shown).

The guide rails 380 are provided with slits 382 in a longitudinal direction thereof. Protrusions 384 formed in the tray 342 are moved in the slits 382 along with sliding of the tray 342, respectively. The Protrusions 384 function as stoppers.

Also in the third embodiment, the tray 342 is fixed with respect to a case (not shown) so as to be reciprocatingly movable only within the restricted range. The tray 342 is moved from a position to another position within the restricted range so as to be moved away from an electrical connection section 386 between optical assemblies (not shown) and the circuit board 316. Other structures, actions, and effects of the third embodiment are the same as those of the above-mentioned first embodiment.

The present invention is not limited to the above-mentioned embodiments, and various modifications can be made. For example, each of the structures described in the section of DETAILED DESCRIPTION OF THE INVENTION can be replaced of substantially the same structure, a structure exerting the same actions and effects, or a structure capable of achieving the same object.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical module, comprising:
    an optical assembly incorporating a light emitting device or a light receiving device for converting one of an electrical signal and an optical signal into another of the electrical signal and the optical signal;
    a circuit board electrically connected to the optical assembly;
    an optical fiber optically connected to the optical assembly;
    a tray for winding the optical fiber therein and pulling out the optical fiber therefrom; and
    a case receiving the optical assembly, the circuit board, the optical fiber, and the tray, wherein:
    the tray is fixed with respect to the case so as to be reciprocatingly movable within a restricted range,
    the tray is fixed to the case so as to be rotatable,
    the tray is moved from a position to another position within the restricted range so as to be moved away from an electrical connection section between the optical assembly and the circuit board, and
    the optical fiber is pulled out from a center axis of rotation of the tray.

2. The optical module according to claim 1, wherein the tray comprises a winding portion around which the optical fiber is arranged while being wound at a plurality of times.

3. An optical module comprising:
    an optical assembly incorporating a light emitting device or a light receiving device for converting one of an electrical signal and an optical signal into another of the electrical signal and the optical signal;
    a circuit board electrically connected to the optical assembly;
    an optical fiber optically connected to the optical assembly;
    a tray for winding the optical fiber therein and pulling out the optical fiber therefrom; and
    a case receiving the optical assembly, the circuit board, the optical fiber, and the tray, wherein:
    the tray is fixed with respect to the case so as to be reciprocatingly movable only within a restricted range; and
    the tray is moved from a position to another position within the restricted range so as to be moved away from an electrical connection section between the optical assembly and the circuit board;
    wherein:
    the tray comprises a winding portion around which the optical fiber is arranged while being wound at a plurality of time;
    the optical module comprises a plurality of the optical assemblies;
    the plurality of the optical assemblies comprise:
        a first optical assembly incorporating the light emitting device; and
        a second optical assembly incorporating the light receiving device;

the optical module comprises a plurality of the optical fibers;
the plurality of the optical fibers comprise:
- a first optical fiber optically connected to the first optical assembly; and
- a second optical fiber optically connected to the second optical assembly;

the tray comprises a plurality of the winding portions; and
the plurality of the winding portions comprise:
- a first winding portion in which the first optical fiber is arranged while being wound around the first winding portion; and
- a second winding portion in which the second optical fiber is arranged while being wound around the second winding portion.

4. The optical module according to claim 3, wherein:
the optical fiber comprises a splice portion at which a cut portion of the optical fiber is spliced;
the winding portion comprises a guide portion for restricting bending of the optical fiber; and
the splice portion is guided with the guide portion.

5. The optical module according to claim 1, wherein movement restriction to at least one direction within the restricted range is performed through bringing the tray into contact with the case or the circuit board.

6. The optical module according to claim 1, further comprising a stopper for restricting the tray from being moved to at least one direction within the restricted range.

7. The optical module according to claim 3, wherein movement restriction to at least one direction within the restricted range is performed through bringing the tray into contact with the case or the circuit board.

8. The optical module according to claim 3, further comprising a stopper for restricting the tray from being moved to at least one direction within the restricted range.

* * * * *